United States Patent
Plank

(10) Patent No.: US 11,675,061 B2
(45) Date of Patent: Jun. 13, 2023

(54) APPARATUSES AND METHODS FOR DETERMINING DEPTH MOTION RELATIVE TO A TIME-OF-FLIGHT CAMERA IN A SCENE SENSED BY THE TIME-OF-FLIGHT CAMERA

(71) Applicant: Infineon Technologies AG, Neubiberg (DE)

(72) Inventor: Hannes Plank, Graz (AT)

(73) Assignee: Infineon Technologies AG, Neubiberg (DE)

( * ) Notice: Subject to any disclaimer, the term of this patent is extended or adjusted under 35 U.S.C. 154(b) by 647 days.

(21) Appl. No.: 16/706,099

(22) Filed: Dec. 6, 2019

(65) Prior Publication Data

US 2020/0182984 A1 Jun. 11, 2020

(30) Foreign Application Priority Data

Dec. 7, 2018 (EP) .................... 18211062

(51) Int. Cl.
*G01S 7/4865* (2020.01)
*G01S 17/894* (2020.01)
*G01S 7/497* (2006.01)

(52) U.S. Cl.
CPC .......... *G01S 7/4865* (2013.01); *G01S 17/894* (2020.01); *G01S 7/497* (2013.01)

(58) Field of Classification Search
None
See application file for complete search history.

(56) References Cited

U.S. PATENT DOCUMENTS

| 9,702,976 | B2 * | 7/2017 | Xu .................. G01S 17/894 |
| 10,024,966 | B2 * | 7/2018 | Patil .................. G01S 17/36 |
| 2014/0049767 | A1 | 2/2014 | Benedetti et al. |
| 2015/0310622 | A1 * | 10/2015 | Kholodenko ........ H04N 13/204 382/154 |

(Continued)

FOREIGN PATENT DOCUMENTS

WO 2015057098 A1 4/2015

OTHER PUBLICATIONS

Single frame correction of motion artifacts in PMD-based time of flight cameras, David Jimenez, Oct. 29, 2014 (Year: 2014).*

(Continued)

*Primary Examiner* — James M Hannett
(74) *Attorney, Agent, or Firm* — Murphy, Bilak & Homilier, PLLC

(57) ABSTRACT

Provided is a method for determining depth motion relative to a time-of-flight camera in a scene sensed by the time-of-flight camera. The method includes determining a first auxiliary depth image from a first set of phase images out of a sequence of phase images of the scene. The sequence of phase images is taken by the time-of-flight camera for a single time-of-flight depth measurement. A second auxiliary depth image is determined from a second set of phase images out of the sequence of phase images. The phase images of the second set of phase images are different from the phase images of the first set of phase images. Information about depth motion relative to the time-of-flight camera for at least part of the scene is determined based on a comparison of depth values represented by pixels in the first auxiliary depth image and the second auxiliary depth image.

12 Claims, 7 Drawing Sheets

(56) References Cited

U.S. PATENT DOCUMENTS

2018/0309970 A1* 10/2018 Gupta .................. G01S 7/4915

OTHER PUBLICATIONS

Jimenez, David, et al., "Single frame correction of motion artifacts in PMD-based time of flight cameras", Image and Vision Computing, Elsevier, vol. 32, No. 12, 2014, pp. 1127-1143.

Lefloch, Damien, et al., "Real-Time Motion Artifacts Compensation of ToF Sensors Data on GPU", Proceedings of SPIE, vol. 8738, 2013.

Lindner, Marvin, et al., "Compensation of Motion Artifacts for Time-of-Flight Cameras", Dyn3D 2009 Proceedings of the DAGM 2009 Workshop on Dynamic 3D Imaging, 2009, pp. 16-27.

* cited by examiner

APPARATUSES AND METHODS FOR DETERMINING DEPTH MOTION RELATIVE TO A TIME-OF-FLIGHT CAMERA IN A SCENE SENSED BY THE TIME-OF-FLIGHT CAMERA

TECHNICAL FIELD

The present disclosure relates to relative motion estimation for Time-of-Flight (ToF) sensing. In particular, examples relate to apparatuses and methods for determining depth motion relative to a ToF camera in a scene sensed by the ToF camera.

BACKGROUND

In many scenes sensed by means of a ToF camera, motion relative to the ToF camera occurs. In particular, relative depth motion with respect to the ToF may occur. However, conventional ToF sensing provides only depth images or pointclouds of the sensed scene. No information about relative depth motion with respect to the ToF camera is provided.

SUMMARY

Hence, there may be a demand for providing information about depth motion relative to a ToF camera in a scene sensed by the ToF camera.

The demand may be satisfied by the subject matter of the appended claims.

An example relates to a method for determining depth motion relative to a ToF camera in a scene sensed by the ToF camera. The method comprises determining a first auxiliary depth image from a first set of phase images out of a sequence of phase images of the scene. The sequence of phase images is taken by the ToF camera for a single ToF depth measurement. Further, the method comprises determining a second auxiliary depth image from a second set of phase images out of the sequence of phase images. The phase images of the second set of phase images are different from the phase images of the first set of phase images. Additionally, the method comprises determining information about depth motion relative to the ToF camera for at least part of the scene based on a comparison of depth values represented by pixels in the first auxiliary depth image and the second auxiliary depth image.

Another example relates to an apparatus for determining depth motion relative to a ToF camera in a scene sensed by the ToF camera. The apparatus comprises a processing circuit configured to determine a first auxiliary depth image from a first set of phase images out of a sequence of phase images of the scene. The sequence of phase images is taken by the ToF camera for a single ToF depth measurement. Further, the processing circuit is configured to determine a second auxiliary depth image from a second set of phase images out of the sequence of phase images. The phase images of the second set of phase images are different from the phase images of the first set of phase images. Additionally, the processing circuit is configured to determine information about depth motion relative to the ToF camera for at least part of the scene based on a comparison of depth values represented by pixels in the first auxiliary depth image and the second auxiliary depth image.

A further example relates to another method for determining depth motion relative to a ToF camera in a scene sensed by the ToF camera. The method comprises determining a first auxiliary depth image based on a first phase-depth mapping function and a single first phase image out of a sequence of phase images of the scene taken by the ToF camera for one or more ToF depth measurements. Further, the method comprises determining a second auxiliary depth image based on a second phase-depth mapping function and a single second phase image out of the sequence of phase images. The method additionally comprises determining information about depth motion relative to the ToF camera for at least part of the scene based on a comparison of depth values represented by pixels in the first auxiliary depth image and the second auxiliary depth image.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a", "an" and "the" is used and using only a single element is neither explicitly nor implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
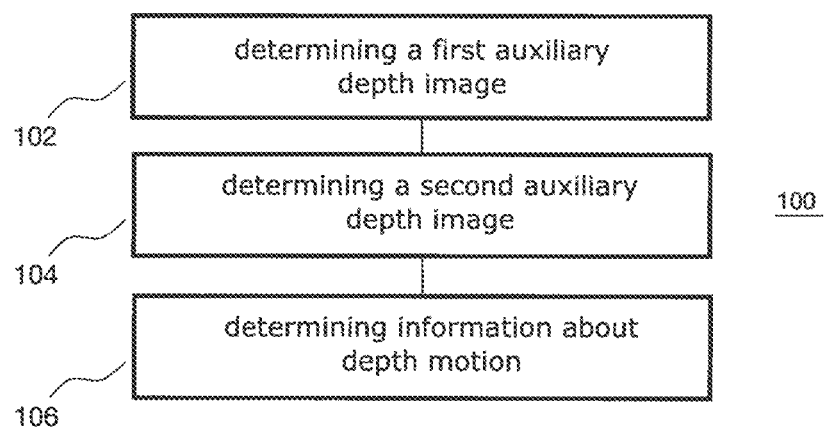
FIG. 1 illustrates a flowchart of an example of a method for determining depth motion relative to a ToF camera in a scene sensed by the ToF camera.

FIG. 1 illustrates a flowchart of a method 100 for determining depth motion relative to a ToF camera in a scene sensed by the ToF camera. The term "depth" as used within the present disclosure refers to the distance between the ToF camera and an object in the scene that is sensed by the ToF camera. Accordingly, the term "depth motion" refers to the relative change in distance between the object and the ToF camera. For determining the depth motion, the method 100 uses a sequence of phase images taken by the ToF camera for a conventional single ToF depth measurement.

Figure 2:
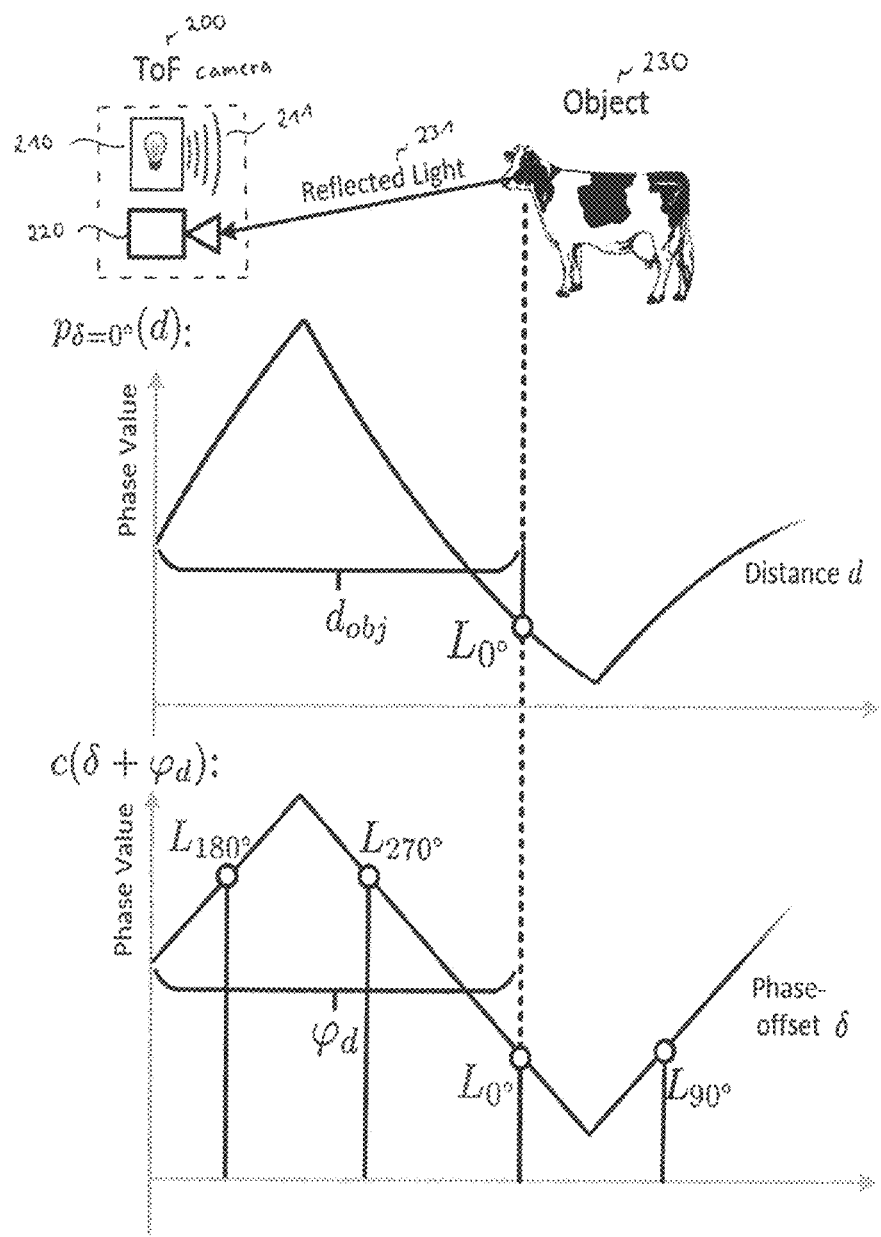
FIG. 2 illustrates a comparison between an exemplary phase-distance function and an exemplary correlation function.

Some basics of ToF depth measurement are illustrated in FIG. 2 and will introductorily be described in the following paragraphs for pedagogical reasons. A ToF camera 200 comprises an illumination element 210 for illuminating the scene with modulated light 211 (e.g. infrared light). The illumination element 210 generates the modulated light 211 based on a (electric) modulated radio frequency transmit signal (e.g. by controlling one or more Light-Emitting Diodes, LEDs, or one or more laser diodes based on the modulated transmit signal). An object 230 in the scene that is illuminated by the modulated light 211 reflects at least part of the modulated light 211 back to a light capturing element 220 (e.g. comprising optics, an image sensor and driver electronics) of the ToF camera 200. In other words, the light capturing element 220 receives reflected light 231 from the object 230.

The image sensor of the light capturing element 220 is pixelated and each pixel measures a fraction of the reflected light 231. Accordingly, (electric) measurement signals based on the reflected light 231 from the scene are generated.

Depending on the distance $d_{obj}$ between the ToF camera 200 and the object 230, i.e. depending on the depth, the reflected light 231 exhibits a delay with respect to the emission of the modulated light 211. Accordingly, the measurement signals experience distance dependent (depth dependent) phase shifts with respect to the modulated transmit signal.

The course of an exemplary phase-distance function p(d) describing the relation between the distance $d_{obj}$ and a phase value L as measured by each pixel of the ToF camera 200 is illustrated in the middle part of FIG. 2. It can be seen from the course of the phase-distance function p(d) that the phase value L as measured by the ToF camera 200 varies depending on the distance d to the object 230.

For determining the phase value L for each pixel, the transmit signal and the measurement signal of the respective pixel are correlated according to a (auto)correlation function $c(\delta+\varphi_d)$. The course of an exemplary correlation function is illustrated in the lower part of FIG. 2. It can be seen from FIG. 2 that the course of the correlation function $c(\delta+\varphi_d)$ substantially reproduces the course of the phase-distance function p(d).

The output of the correlation function $c(\delta+\varphi_d)$ is the phase value L for each pixel. The determined phase values L are then combined to a phase image. That is, the phase image comprises a plurality of pixels each representing a corresponding phase value L.

In order to sample the correlation function $c(\delta+\varphi_d)$, plural phase images are generated. The plural phase images are denoted as the "sequence of phase images" in the present disclosure. A phase offset $\delta$ between the modulated transmit signal and the measurement signals as used for the correlations varies between the individual phase images of the sequence of phase images. In other words, different phase offsets $\delta$ are used for correlating the transmit signal and the measurement signals in order to obtain the individual phase images of the sequence of phase images.

Sampling the same object at the same distance and exhibiting the same reflectivity enables to sample the correlation function $c(\delta+\varphi_d)$. In the example of FIG. 2, the sequence of phase images comprises four phase images, wherein the phase offset $\delta$ used for the correlation is different by 90° for each phase image. For example, phase offsets of 0°, 90°, 180° and 270° may be used to generate four phase images each comprising a plurality of pixels that represent corresponding phase values $L_{0°}$, $L_{90°}$, $L_{180°}$ and $L_{270°}$.

For the phase value $L_{0°}$, the correlation function $c(\delta+\varphi_d)$ is shifted by the distance dependent phase shift $\varphi_d$ between the measurement signal and the modulated transmit signal of the pixel with respect to the zero value of the function's argument.

Using the four phase values $L_{0°}$, $L_{90°}$, $L_{180°}$ and $L_{270°}$ that sample the correlation function $c(\delta+\varphi_d)$, the phase shift $\varphi_d$ may be determined as follows:

$$\varphi_d = a\tan2\left(\frac{L_{90°} - L_{270°}}{L_{0°} - L_{180°}}\right) \quad (1)$$

Taking into account the speed of light c and the modulation frequency $f_p$ of the emitted light 211 (i.e. the modulation frequency of the modulated transmit signal), the distance $d_{obj}$ to the object, i.e. the depth, may be calculated as follows:

$$d_{obj} = \frac{c}{2} \cdot \frac{\varphi_d}{2\pi \cdot f_p} \quad (2)$$

By determining the depth for the individual pixels of the ToF camera 200, depth information for at least part of the sensed scene is obtained by the ToF camera 200. The output of the ToF depth measurement may, e.g., be a two-dimensional depth image representing the scene or a three-dimensional point cloud representing the scene. It is to be noted that the above described ToF depth measurement is exemplary and that a variety of other measurement principles/approaches using more or less phase images, using different approaches for determining the phase images, using different frequencies for the modulated light 211, etc. exist. However, the approaches have in common that a sequence of phase images is generated (obtained) which are used by the method 100 for determining the depth motion relative to the ToF camera. Therefore, the method 100 is not dependent on the specific principle/approach for obtaining the phase images.

Referring back to FIG. 1, method 100 comprises determining 102 a first auxiliary depth image from a first set of phase images out of a sequence of phase images of the scene. As described above, the sequence of phase images is taken by the ToF camera for a single ToF depth measurement.

Further, method 100 comprises determining 104 a second auxiliary depth image from a second set of phase images out of the sequence of phase images. The phase images of the second set of phase images are different from the phase images of the first set of phase images. In other words, different phase images out of the sequence of phase images are used for determining the first and second auxiliary depth images.

The term "auxiliary" as used within the present disclosure denotes that the first and second auxiliary depth images are not the result of the regular single ToF depth measurement. The first and second auxiliary depth images are generated by using only subsets of the sequence of phase images for the regular single ToF depth measurement.

In the above example for generating a regular depth image, four phase images were taken by the ToF camera 200. However, method 100 is not limited to sequences of phase images that comprises exactly four phase images. Generally, at least two phase images are used to generate a depth image in ToF imaging. Accordingly, the sequences of phase images comprises at least four phase images so that the two auxiliary depth images may be determined. For example, the sequence of phase images may comprise eight or more phase images since using more phase images may allow to compensate various error sources and/or ambiguities affecting the quality of the regular single ToF depth measurement.

The first set of phase images as well as the second set of phase images each comprises at least two phase images out of the sequence of phase images. The number of phase images in the first set of phase images may be equal or different from the number of phase images in the second set of phase images. In other words, different numbers of phase images out of the sequence of phase images may be used for determining the first and second auxiliary depth images.

The first and second auxiliary depth images each comprise a plurality of pixels that represent respective depth values. The depth values indicate the distance between the ToF camera and a part of the sensed scene that is represented by the individual pixel.

The individual phase images of the sequence of phase images are captured (taken) sequentially by the ToF camera at consecutive (successive) time instants. While capturing the individual phase images of the sequence of phase images, depth motion relative to the ToF camera may occur in the sensed scene. For example, an object in the sensed scene may approach the ToF camera. Information about the changing distance of the object relative to the ToF camera is contained in the phase images captured by the ToF camera. In particular, the phase value(s) represented by one or more pixels in the individual phase images change due to the movement of the object. Since the first and second auxiliary depth images are based on only subsets of the whole sequence of phase images, the first and second auxiliary depth images represent different depth values at corresponding pixel positions. By pixelwise comparing the first and second auxiliary depth images, depth motion relative to the ToF camera may, hence, be determined. Therefore, method 100 further comprises determining 106 information about depth motion relative to the ToF camera for at least part of the scene based on a comparison of depth values represented by pixels in the first auxiliary depth image and the second auxiliary depth image.

For example, the pixels in the first auxiliary depth image and the second auxiliary depth image being compared for determining the information about the depth motion relative to the ToF camera may be located at identical pixel positions in the first auxiliary depth image and the second auxiliary depth image. In other words, pixels at identical pixel positions in the first auxiliary depth image and the second auxiliary depth image may be compared to determine the information about the depth motion. Alternatively, if the object also moves transversely to the ToF camera (e.g. the object moves further to the left as seen by the ToF camera), the pixels in the first auxiliary depth image and the second auxiliary depth image being compared for determining the information about the depth motion relative to the ToF camera may be located at different pixel positions in the first auxiliary depth image and the second auxiliary depth image. In other words, pixels at different pixel positions in the first auxiliary depth image and the second auxiliary depth image may be compared to determine the information about the depth motion.

The information about the depth motion relative to the ToF camera may be manifold. For example, the information about the depth motion relative to the ToF camera may indicate the relative change in depth or distance (e.g. ±20 cm with respect to the ToF camera) or a velocity of the depth motion relative to the ToF camera (e.g. ±2 m/s; taking into account the capture times of the phase images used for determining the first and second auxiliary depth images)

If the regular ToF depth measurement produces a two-dimensional depth image representing the scene, the information about the depth motion relative to the ToF camera may, e.g., be a two-dimensional image comprising a plurality of pixels each representing the depth motion for a corresponding pixel of the depth image. Accordingly, a respective depth motion may be provided for the individual pixels of the regular depth image.

If the regular ToF depth measurement produces a three-dimensional point cloud representing the scene, the information about the depth motion relative to the ToF camera may, e.g., be a plurality of three-dimensional vectors each representing the depth motion for a corresponding point of the point cloud. Accordingly, a respective depth motion may be provided for the individual points of the point cloud.

As indicated above, there a variety of options for selecting phase images out of the sequence of phase for the first and second sets of phase images provided that different phase images are used for the first and second sets of phase images. For example, the first set of phase images may be two consecutive phase images out of the sequence of phase images, whereas the first set of phase images may be two different consecutive phase images out of the sequence of phase images. In some examples, the first set of phase images is the first two phase images out of the sequence of phase images, and the second set of phase images is the last two phase images out of the sequence of phase images. Similarly, three, four or more phase images may be selected for the first set and/or the second set of phase images.

The first set of phase images and the second set of phase images may be separated by at least one intermediate phase image in the sequence of phase images. Using one or more intermediate phase images between the first and second sets of phase images may allow to introduce a time difference between the capture times of the phase image of the first and second sets of phase images. In other words, the number of intermediate phase images between the first and second sets of phase images may allow to adjust a time difference between the captured states of the scene as represented by the first and second auxiliary depth images. Accordingly, by selecting an appropriate number of intermediate phase images between the first and second sets of phase images, the time difference between the states of the scene as represented by the first and second auxiliary depth images may be large enough (sufficient) to resolve the depth motion in the scene.

Figure 3:
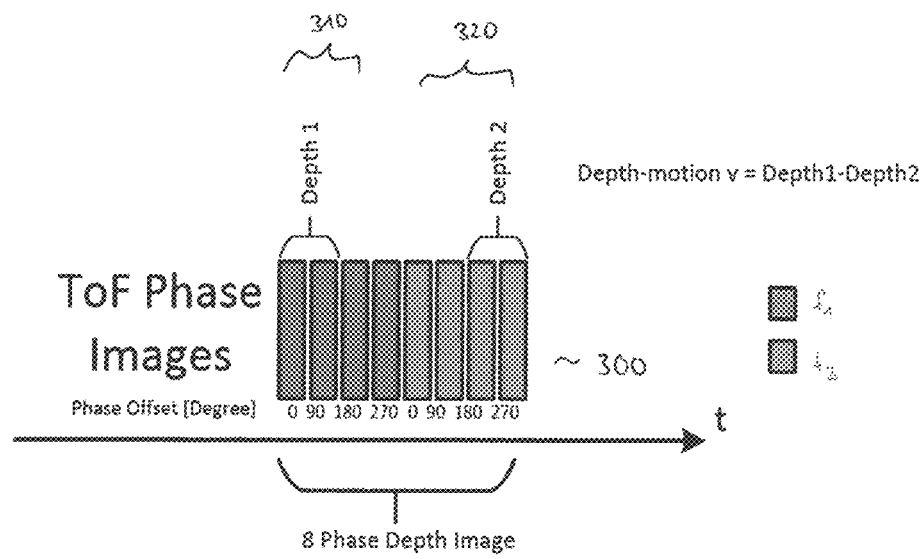
FIG. 3 illustrates an exemplary sequence of phase images.

An exemplary sequence 300 of phase images for a single regular ToF depth measurement is illustrated in FIG. 3. The sequence 300 of phase images comprises eight successively captured phase images (as indicated by timeline t).

As described above, the ToF camera uses a modulated transmit signal for illuminating the scene and generates measurement signals based on reflected light from the scene. The individual phase images of the sequence 300 of phase images are based on correlations of the transmit signal and the measurement signals according to a correlation function. A phase offset δ between the transmit signal and the measurement signals as used for the correlations varies between the individual phase images of the sequence 300 of phase images.

The ToF camera uses a transmit window, i.e. a time period of predefined length, for illuminating the scene. In the example illustrated in FIG. 3, the transmit signal exhibits a first frequency $f_1$ during a first part of the transmit window and a second frequency $f_2$ during a second part of the transmit window to compensate for various error sources. In other words, the scene is first illuminated using modulated light with the first modulation frequency $f_1$ and successively illuminated using modulated light with the second modulation frequency $f_2$. Accordingly, a first part 310 of the sequence 300 of phase images is associated to the first frequency $f_1$ and a second part 320 of the sequence 300 of phase images is associated to the second frequency $f_2$.

In accordance with method 100, the first part 310 of the sequence 300 of phase images comprises the first set of phase images used for determining the first auxiliary depth image, and wherein the second part 320 of the sequence 300 of phase images comprises the second set of phase images used for determining the second auxiliary depth image. In the example of FIG. 3, the first set of phase images is the first two phase images out of the sequence 300 of phase images, and the second set of phase images is the last two phase images out of the sequence 300 of phase images. Since there are four other phase images captured in-between, the time difference is sufficient for resolving the depth motion in the sensed scene.

A motion estimate relative to the ToF camera may be determined (e.g. calculated) based on the difference between the first and second auxiliary depth images.

In order to enhance the quality of the first and second auxiliary depth images, the other phase images of the sequence of phase images (i.e. the phase images not contained in the first and second sets of phase images) may be used. This is exemplarily described in the following with reference to FIG. 4. Similar to FIG. 2, FIG. 4 illustrates a relation between the distance $d_{obj}$ of the object 230 to the ToF camera 200 and a phase value L as measured by each pixel of the ToF camera 200.

Figure 4:
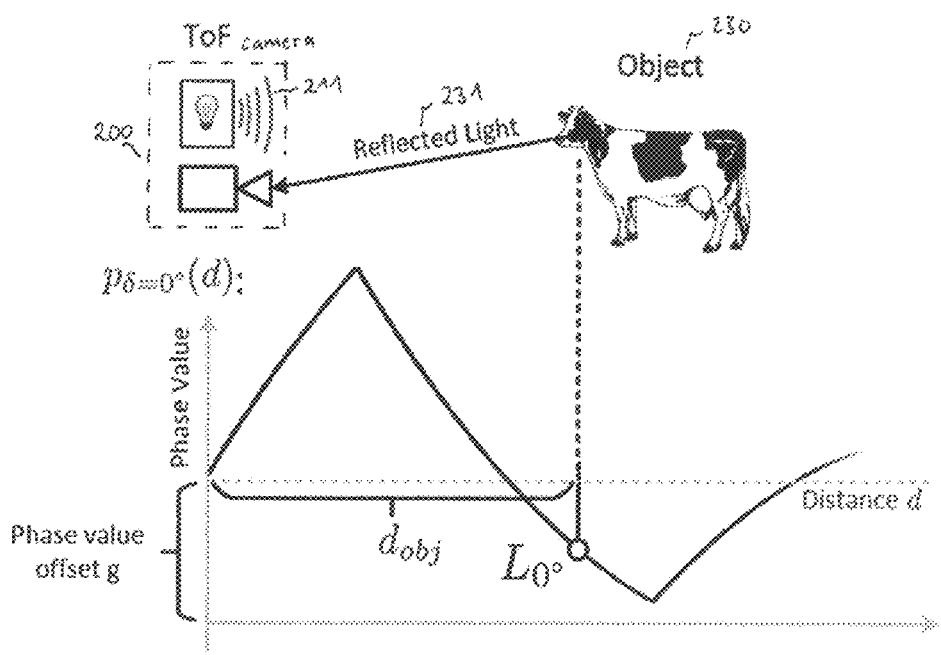
FIG. 4 illustrates another exemplary phase-distance function.

It can be seen from FIG. 4 that the values of the phase-distance function p(d) is not centered around the zero value of the function's output (the phase value L). In particular, the phase values L as output by the phase-distance function p(d) exhibit a phase-value offset g. The same is true for the correlation function used by the ToF camera 200 for correlating the measurement signals and the modulated transmit signal, i.e. for determining the phase values L. The other phase images of the sequence of phase images may be used to estimate the phase-value offset g.

As described above, a depth image may be determined based on only two phase images. In particular, the (depth dependent) phase shifts $\delta_d$ of the measurement signals with respect to the modulated transmit signal may be determined based on only two phase images. For example, two phase images exhibiting a relative phase offset of δ=90° may be used for determining the phase shifts $\delta_d$. This is exemplarily explained for a single pixel in the following using the phase image determined using the phase offset of δ=0° and the phase image determined using the phase offset of δ=90° (e.g. the first two phase images of the sequence 300 illustrated in FIG. 3).

The phase shift $\delta_d$ may be calculated as follows:

$$\varphi_d = a\tan2\left(\frac{L_{90°} - g}{L_{0°} - g}\right) \qquad (3)$$

As can be seen from mathematical expression (3), the phase values of the phase images used for determining one of the auxiliary depth images are modified based on the phase-value offset g. The phase phase-value offset g may be identical for all pixels or alternatively be individual for each value.

The depth may values may subsequently be determined (calculated) according to above mathematical expression (2).

Speaking more general, determining 102 the first auxiliary depth image from the first set of phase images may comprise for at least one pixel of the first auxiliary depth image modifying a first phase value and a second phase value represented by two pixels at an identical pixel position in the phase images of the first set of phase images by the phase-value offset of the correlation function for obtaining a modified first phase value and a modified second phase value. Further, determining 102 the first auxiliary depth image may comprise determining a depth value represented by the pixel of the first auxiliary depth image based on a combination of the modified first phase value and the modified second phase value. The pixel of the first auxiliary depth image is located the same pixel position in the first auxiliary depth image as the pixels in the phase images of the first set of phase images.

The phase-value offset g depends on a manifold of factors such as manufacturing variations, calibration, temperature, etc. and may be determined (estimated) in different manners. The phase phase-value offset g may be identical for all pixels or alternatively be individual for each pixel.

In some examples, a constant value may be assumed for the phase-value offset g to obtain a coarse estimate for the phase-value offset g and the depth motion.

In other examples, the phase-value offset g of the correlation function may be determined based on another phase image taken by the ToF camera without prior illumination of the scene. By capturing a phase image with light exposure, a phase-value offset g for each pixel may be obtained and allow compensation of certain error influences.

Further alternatively, the phase-value offset g of the correlation function may be determined based on a combination of the first phase value, the second phase value and one or more further phase values. Each of the one or more further phase values is represented by a pixel of another phase image out of the sequence of phase images that is located at the same pixel position as the pixels in the phase images of the first set of phase images. In other words, phase-value offset g may be determined using further samples of the correlation function. For example, in the sequence 300 of phase images, the phase values of the phase images associated to the first frequency may be combined for determining the phase-value offset g:

$$g = \frac{L_{0°} + L_{90°} + L_{180°} + L_{270°}}{4} \quad (4)$$

In other words, the phase-value offset g of the correlation function may be the mean value of the first phase value, the second phase value and the one or more further phase values.

To summarize, method 100 may allow to provide valuable additional sensor information without changing the operation of the regular ToF depth measurement.

Figure 5:
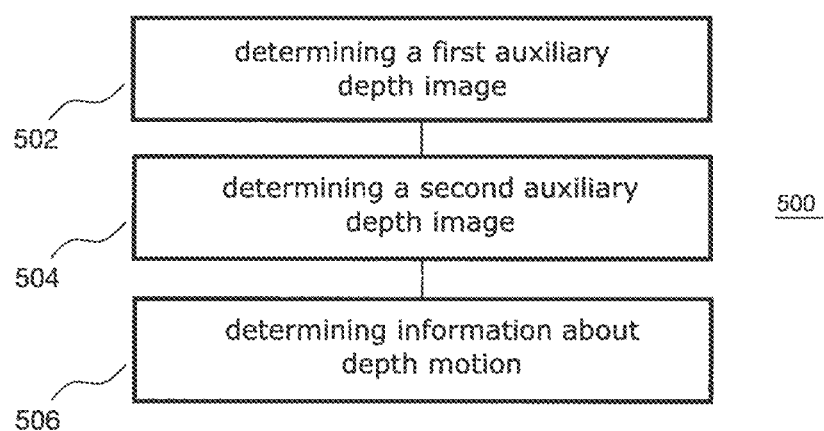
FIG. 5 illustrates a flowchart of an example of another method for determining depth motion relative to a ToF camera in a scene sensed by the ToF camera.

FIG. 5 further illustrates a flowchart of another method 500 for determining depth motion relative to a ToF camera that uses only single phase images. As described above, the ToF camera takes a sequence of phase images of the scene for one or more ToF depth measurements.

Method 500 comprises determining 502 a first auxiliary depth image based on a first phase-depth mapping function and a single first phase image out of the sequence of phase images. Further, method 500 comprises determining 504 a second auxiliary depth image based on a second phase-depth mapping function and a single second phase image out of the sequence of phase images.

The first and second phase-depth mapping functions are functions that receive a phase value as argument and that output a depth value (distance value) based on the input phase value. In other words, first and second phase-depth mapping functions assign (allocate) a depth value (distance value) to an input phase value. The first and second mapping functions may be identical or different. In some examples, different mapping functions may be used for different pixels of the ToF camera. The mapping functions depend on the phase-distance function of the ToF camera, which is influenced (depending) on a manifold of parameters such as temperature, shape of the emitted light (pulses), etc. For example, at least one of the first and the second phase-depth mapping function may be based on a simulation of the ToF camera. Alternatively, at least one of the first and the second phase-depth mapping function may be based on a calibration of the ToF camera.

Method 500 further comprises determining 506 information about depth motion relative to the ToF camera for at least part of the scene based on a comparison of depth values represented by pixels in the first auxiliary depth image and the second auxiliary depth image.

As previously described with reference to method 100, the first and second auxiliary depth images each comprise a plurality of pixels that represent respective depth values. The depth values indicate the distance between the ToF camera and a part of the sensed scene that is represented by the individual pixel.

The individual phase images of the sequence of phase images are captured (taken) sequentially by the ToF camera at consecutive (successive) time instants so that the phase value(s) represented by one or more pixels in the individual phase images change if depth movement of an object in the scene occurs. Since the first and second auxiliary depth images are based on only single phase images of the whole sequence of phase images, the first and second auxiliary depth images represent different depth values at corresponding pixel positions. The pixelwise comparison of the first and second auxiliary depth images hence allows to determine depth motion relative to the ToF camera.

For example, the pixels in the first auxiliary depth image and the second auxiliary depth image being compared for determining the information about the depth motion relative to ToF camera may be located at identical pixel positions in the first auxiliary depth image and the second auxiliary depth image. In other words, pixels at identical pixel positions in the first auxiliary depth image and the second auxiliary depth image may be compared to determine the information about the depth motion. Alternatively, if the object also moves transversely to the ToF camera (e.g. the object moves further to the left as seen by the ToF camera), the pixels in the first auxiliary depth image and the second auxiliary depth image being compared for determining the information about the depth motion relative to the ToF camera may be located at different pixel positions in the first auxiliary depth image and the second auxiliary depth image. In other words, pixels at different pixel positions in the first auxiliary depth image and the second auxiliary depth image may be compared to determine the information about the depth motion.

The information about the depth motion relative to the ToF camera may be manifold. For example, the information about the depth motion relative to the ToF camera may indicate the relative change in depth or distance (e.g. ±20 cm with respect to the ToF camera) or a velocity of the depth motion relative to the ToF camera (e.g. ±2 m/s; taking into account the capture times of the phase images used for determining the first and second auxiliary depth images)

If the regular ToF depth measurement produces a two-dimensional depth image representing the scene, the information about the depth motion relative to the ToF camera may, e.g., be a two-dimensional image comprising a plurality of pixels each representing the depth motion for a corresponding pixel of the depth image. Accordingly, a respective depth motion may be provided for the individual pixels of the regular depth image.

If the regular ToF depth measurement produces a three-dimensional point cloud representing the scene, the information about the depth motion relative to the ToF may, e.g., be a plurality of three-dimensional vectors each representing the depth motion for a corresponding point of the point cloud. Accordingly, a respective depth motion may be provided for the individual points of the point cloud.

Figure 6:
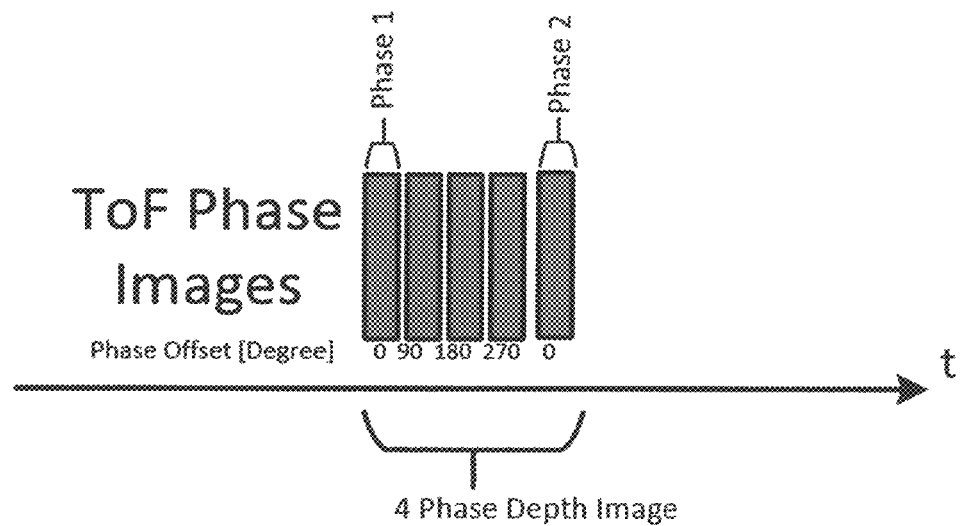
FIG. 6 illustrates another exemplary sequence of phase images.

FIG. 6 illustrates an exemplary sequence 600 of phase images for two ToF depth measurements. The sequence 600 of phase images comprises five successively captured phase images (as indicated by timeline t).

As described above, the ToF camera uses a modulated transmit signal for illuminating the scene and generates measurement signals based on reflected light from the scene. The individual phase images of the sequence 600 of phase images are based on correlations of the transmit signal and the measurement signals according to a correlation function. A phase offset δ between the transmit signal and the measurement signals as used for the correlations varies between the individual phase images of the sequence 600 of phase images. In the example of FIG. 6, the modulated transmit signal exhibits a constant frequency during the transmit window used for illuminating the scene.

In accordance with method 500, the first phase image of the sequence 600 of phase images is used for determining the first auxiliary depth image, and the last phase image of the sequence 600 of phase images is used for determining the second auxiliary depth image.

A motion estimate relative to the ToF camera may be determined (e.g. calculated) based on the difference between the first and second auxiliary depth images. The phase offset δ between the transmit signal and the measurement signals as used for the correlations is identical for the two phase images.

Figure 7:
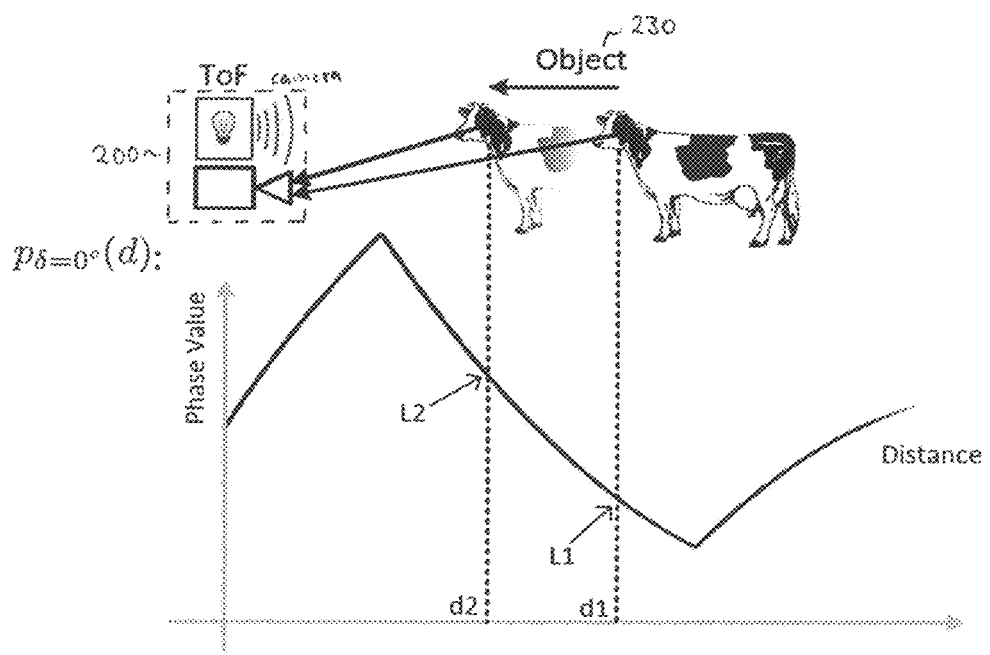
FIG. 7 illustrates another exemplary phase-distance function.

It can be seen from the course of the exemplary phase distance function p(d) illustrated in FIG. 7 that the phase value L as measured by a pixel of the ToF camera 200 changes if the object 230 in the scene changes its distance to the ToF camera 200 while the phase images are captured. While a distance d1 between the object 230 and the ToF camera 200 causes a phase value L1, a different distance d2 between the object 230 and the ToF camera 200 causes a different phase value L2. This relation is taken into account by the first and second phase-depth mapping functions converting measured phase values into depth values.

In order to compensate for the phase-value offset g of the correlation function and the amount of received light (which corresponds to the amplitude of the correlation function), the phase values may be normalized.

That is, determining 502 the first auxiliary depth image may comprise for at least one pixel of the first auxiliary depth image normalizing a phase value represented by a pixel of the first phase image for obtaining a normalized phase value. The pixel of the first auxiliary depth image is located at the same pixel position in the first auxiliary depth image as the pixel in the first phase image. Further, determining 502 the first auxiliary depth image may comprise determining a depth value represented by the pixel of the first auxiliary depth image based on the first phase-depth mapping function and the normalized phase value.

Determining 504 the second auxiliary depth image may be done equally using the second phase image and the second phase-depth mapping function.

Referring to the sequence 600 of phase images illustrated in FIG. 6, the amount a of received light may, e.g., be determined as follows for the individual pixels:

$$a = \frac{\sqrt{(L_{270°} - L_{90°})^2 + (L_{180°} - L_{0°})^2}}{2} \quad (5)$$

The normalized phase value $L_n$ may subsequently be determined as follows for the individual pixels:

$$L_n = \frac{L - g}{a} \quad (6)$$

As described above, a constant value may be assumed for the phase-value offset g in some examples, whereas in other examples the phase-value offset g of the correlation function may be determined based on another phase image taken by the ToF camera without prior illumination of the scene.

Further alternatively, the phase-value offset g of the correlation function may be determined based on a combination of the phase value represented by the pixel of the first phase image and one or more further phase values. Each of the one or more further phase values is represented by a pixel of another phase image out of the sequence of phase images that is located at the same pixel position as pixel of the first phase image. In some examples, the phase-value offset g of the correlation function may be the mean value of the phase value represented by the pixel of the first phase image and one or more further phase values. For example, the phase-value offset g may be determined according to above mathematical expression (4) for the sequence 600 of phase images.

Using the first and second phase-depth mapping functions $h_1$ and $h_2$, information about depth motion may be determined for individual pixels. For example, a depth motion velocity v may be determined as follows for individual pixels:

$$v = \frac{h_1(L_{n1}) - h_2(L_{n2})}{\Delta t}, \quad (7)$$

wherein $L_{n1}$ denotes the normalized phase value of a pixel in the first phase image, $L_{n2}$ denotes the normalized phase value of a pixel in the second phase image and $\Delta t$ denotes the time difference between the capture times of the first and second phase images.

Figure 8:
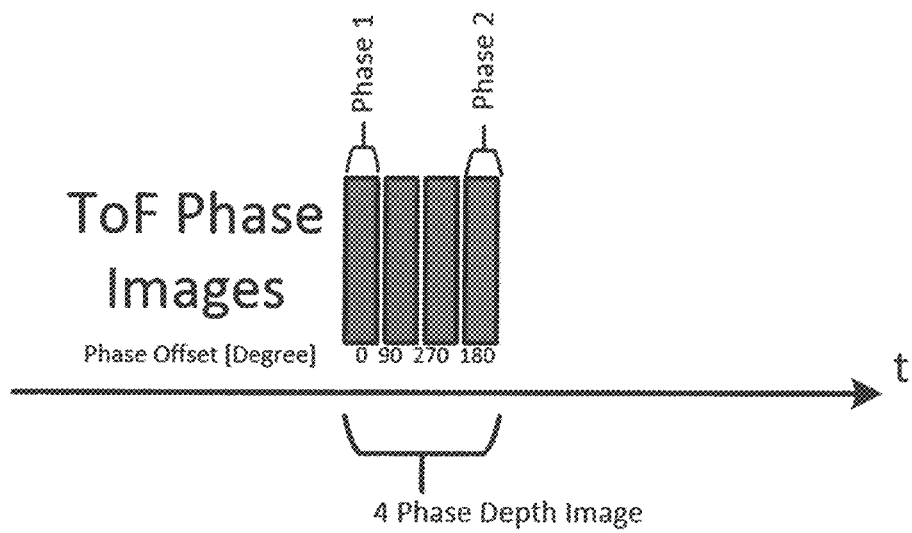
FIG. 8 illustrates a further exemplary sequence of phase images.

Another exemplary sequence 800 of phase images for a single ToF depth measurement is illustrated in FIG. 8. The sequence 800 of phase images comprises four successively captured phase images (as indicated by timeline t). In the example of FIG. 8, the modulated transmit signal exhibits a constant frequency during the transmit window used for illuminating the scene.

A phase offset δ between the transmit signal and the measurement signals as used for the correlations varies between the individual phase images of the sequence 800 of phase images.

In accordance with method 500, the first phase image of the sequence 800 of phase images is used for determining the first auxiliary depth image, and the last phase image of the sequence 800 of phase images is used for determining the second auxiliary depth image.

A motion estimate relative to the ToF camera may be determined (e.g. calculated) based on the difference between the first and second auxiliary depth images. The phase offset δ between the transmit signal and the measurement signals as used for the correlations differs by 180° for the two phase image. In other words, the relative phase offset δ between the phase images used for determining the auxiliary depth images is 180°.

Figure 9:
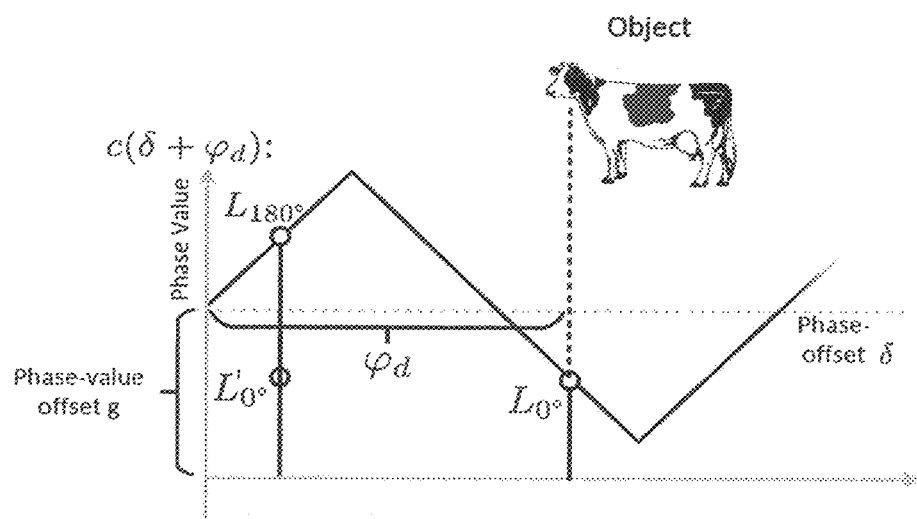
FIG. 9 illustrates another exemplary correlation function.

In the above described example, two phase images with a relative phase offset of δ=0° was used for determining the auxiliary depth images. Similarly, two phase images with a relative phase offset of δ=180° may be used if the phase values of one the two phase images are "rotated" by 180°. FIG. 9 illustrates the course of an exemplary correlation function c(δ+φ_d). Rotating one of the first and second phase values $L_0°$ and $L_{180°}$ effectively corresponds to mirroring the phase value around the phase-value offset g of the correlation function.

As described above, a constant value may be assumed for the phase-value offset g in some examples, whereas in other examples the phase-value offset g of the correlation function may be determined based on another phase image taken by the ToF camera without prior illumination of the scene.

Further alternatively, the phase-value offset g of the correlation function may be determined based on a combination of the first phase value, the second phase value and one or more further phase values, wherein each of the one or more further phase values is represented by a pixel of another phase image out of the sequence of phase images that is located at the same pixel position as the pixels in the first phase image and the second phase image. In some examples, the phase-value offset of the correlation function may be the mean value of the first phase value, the second phase value and the one or more further phase values. For example, the phase-value offset g may be determined according to above mathematical expression (4) for the sequence 800 of phase images.

Mirroring a phase value L around the phase-value offset g for obtaining the modified phase value L' is equivalent to the following mathematical expression:

$$L' = g - (L - g) \tag{8}$$

The rotation is exemplarily illustrated in FIG. 9 for the phase value $L_{180}°$ of the phase image using the 180° phase offset for the correlation. The result of the rotation of the phase value $L_{180}°$ is the modified phase value $L'_0°$.

If the distance between the object 230 and the ToF camera 230 does not change while the phase images are captured, phase value $L'_0°$ is (substantially) equal to phase value $L_0°$. However, if the distance between the object 230 and the ToF camera 230 changes, the phase value $L'_0°$ is different from phase value $L_0°$.

Distance values, i.e. the auxiliary depth images, may be determined based on the phase values $L'_0°$ and $L_0°$ using the first and second phase-depth mapping functions and the normalization as described above (e.g. according to mathematical expressions (5) and (6)).

Speaking more general, determining 502 the first auxiliary depth image may comprise for at least one pixel of the first auxiliary depth image modifying a phase value represented by a pixel of the first phase image using the phase-value offset g of the correlation function for obtaining a modified phase value. The pixel of the first auxiliary depth image is located at the same pixel position in the first auxiliary depth image as the pixel in the first phase image. For example, modifying the phase value represented by the pixel of the first phase image may be based on an expression which is mathematically correspondent to above mathematical expression (8). Further, determining 502 the first auxiliary depth image may comprise normalizing the modified phase value for obtaining a normalized phase value, and determining a depth value represented by the pixel of the first auxiliary depth image based on the first phase-depth mapping function and the normalized phase value.

Accordingly, determining 504 the second auxiliary depth image may comprise for at least one pixel of the second auxiliary depth image normalizing a phase value represented by a pixel of the second phase image for obtaining another normalized phase value. The pixel of the second auxiliary depth image is located at the same pixel position in the second auxiliary depth image as the pixel in the second phase image and the pixel in the first phase image. Further, determining 504 the second auxiliary depth image may comprise determining a depth value represented by the pixel of the second auxiliary depth image based on the second phase-depth mapping function and the other normalized phase value.

Also, method 500 may allow to use the information already gathered for a ToF depth measurement to additionally generate a motion estimate for sensed objects relative to the ToF camera. By setting the relative phase offset between the used single phase images to predefined values (e.g. 0° or 180°), it may be avoided that the peak of the correlation function is located at the object. Accordingly, two single phase images may be sufficient for estimating a distance difference relative to the ToF camera.

Figure 10:
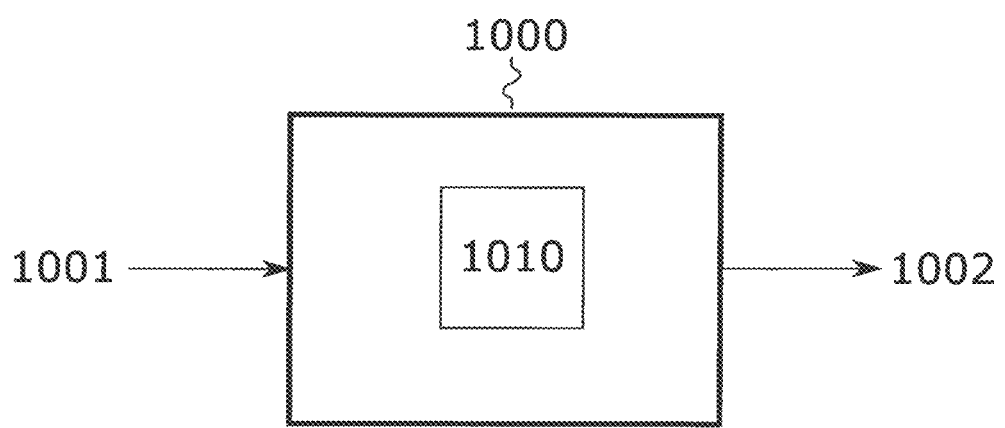
FIG. 10 illustrates an example of an apparatus for determining depth motion relative to a ToF camera in a scene sensed by the ToF camera.

An example of an apparatus 1000 for determining depth motion relative to a ToF camera according to proposed concepts is further illustrated in FIG. 10. The apparatus 1000 comprises a processing circuit 1010. For example, the processing circuit 1010 may be a single dedicated processor, by a single shared processor, or a plurality of individual processors, some of which or all of which may be shared, a digital signal processor (DSP) hardware, an application specific integrated circuit (ASIC) or a field programmable gate array (FPGA). The processing circuit 1010 may optionally be coupled to, e.g., read only memory (ROM) for storing software, random access memory (RAM) and/or non-volatile memory. The apparatus 1000 may further comprise other hardware—conventional and/or custom.

The apparatus 1000 receives input data 1001 representing the sequence of phase images. The processing circuit 1010 processes the input data 1001 according to the above described concepts for determining (obtaining) information about depth motion relative to the ToF camera. Accordingly, the apparatus 1000 outputs output data 1002 representing the information about the depth motion relative to the ToF camera.

For example, the functionalities of apparatus 1000 may be implemented in an application processor coupled to a ToF camera module providing the phase images (i.e. image raw data).

The examples as described herein may be summarized as follows:

Some examples relate to a method for determining depth motion relative to a ToF camera in a scene sensed by the ToF camera. The method comprises determining a first auxiliary depth image from a first set of phase images out of a sequence of phase images of the scene. The sequence of phase images is taken by the ToF camera for a single ToF depth measurement. Further, the method comprises determining a second auxiliary depth image from a second set of phase images out of the sequence of phase images. The phase images of the second set of phase images are different from the phase images of the first set of phase images. Additionally, the method comprises determining information about depth motion relative to the ToF camera for at least part of the scene based on a comparison of depth values represented by pixels in the first auxiliary depth image and the second auxiliary depth image.

In some examples, if the ToF depth measurement produces a two-dimensional depth image representing the scene, the information about depth motion relative to the ToF camera may be a two-dimensional image comprising a plurality of pixels each representing the depth motion for a corresponding pixel of the depth image.

If the ToF depth measurement produces a three-dimensional point cloud representing the scene, the information about depth motion relative to the ToF camera may be a plurality of three-dimensional vectors each representing the depth motion for a corresponding point of the point cloud.

In some examples, the first set of phase images is two consecutive phase images out of the sequence of phase images.

According to some examples the first set of phase images is the first two phase images out of the sequence of phase images, and wherein the second set of phase images is the last two phase images out of the sequence of phase images.

The first set of phase images and the second set of phase images may in some examples be separated by at least one intermediate phase image in the sequence of phase images.

According to some examples, the ToF camera uses a modulated transmit signal for illuminating the scene and generates measurement signals based on reflected light from the scene. The individual phase images of the sequence of phase images are based on correlations of the transmit signal and the measurement signals according to a correlation function. A phase offset between the transmit signal and the measurement signals as used for the correlations varies between the individual phase images of the sequence of phase images.

In some examples, the transmit signal exhibits a first frequency during a first part of a transmit window for illuminating the scene and a second frequency during a second part of the transmit window so that a first part of the sequence of phase images is associated to the first frequency and a second part of the sequence of phase images is associated to the second frequency.

The first part of the sequence of phase images may comprise the first set of phase images, wherein the second part of the sequence of phase images may comprise the second set of phase images.

In some examples, determining the first auxiliary depth image from the first set of phase images may comprise for at least one pixel of the first auxiliary depth image: modifying a first phase value and a second phase value represented by two pixels at an identical pixel position in the phase images of the first set of phase images by the phase-value offset of the correlation function for obtaining a modified first phase value and a modified second phase value; and determining a depth value represented by the pixel of the first auxiliary depth image based on a combination of the modified first phase value and the modified second phase value.

According to some examples, the pixel of the first auxiliary depth image may be located the same pixel position in the first auxiliary depth image as the pixels in the phase images of the first set of phase images.

The phase-value offset of the correlation function may in some examples be determined based on another phase image taken by the ToF camera without prior illumination of the scene.

Alternatively, the phase-value offset of the correlation function may be determined based on a combination of the first phase value, the second phase value and one or more further phase values. Each of the one or more further phase values is represented by a pixel of another phase image out of the sequence of phase images that is located at the same pixel position as the pixels in the phase images of the first set of phase images.

In some examples, the phase-value offset of the correlation function may be the mean value of the first phase value, the second phase value and the one or more further phase values.

According to some examples, the pixels in the first auxiliary depth image and the second auxiliary depth image being compared for determining the information about depth motion relative to the ToF camera may be located at identical pixel positions in the first auxiliary depth image and the second auxiliary depth image.

Alternatively, the pixels in the first auxiliary depth image and the second auxiliary depth image being compared for determining the information about depth motion relative to the ToF camera may be located at different pixel positions in the first auxiliary depth image and the second auxiliary depth image.

Other examples relate to an apparatus for determining depth motion relative to a ToF camera in a scene sensed by the ToF camera. The apparatus comprises a processing circuit configured to determine a first auxiliary depth image from a first set of phase images out of a sequence of phase images of the scene. The sequence of phase images is taken by the ToF camera for a single ToF depth measurement. Further, the processing circuit is configured to determine a second auxiliary depth image from a second set of phase images out of the sequence of phase images. The phase images of the second set of phase images are different from the phase images of the first set of phase images. Additionally, the processing circuit is configured to determine information about depth motion relative to the ToF camera for at least part of the scene based on a comparison of depth values represented by pixels in the first auxiliary depth image and the second auxiliary depth image.

Further examples relate to another method for determining depth motion relative to a ToF camera in a scene sensed by the ToF camera. The method comprises determining a first auxiliary depth image based on a first phase-depth mapping function and a single first phase image out of a sequence of phase images of the scene taken by the ToF camera for one or more ToF depth measurements. Further, the method comprises determining a second auxiliary depth image based on a second phase-depth mapping function and a single second phase image out of the sequence of phase images. The method additionally comprises determining information about depth motion relative to the ToF camera for at least part of the scene based on a comparison of depth values represented by pixels in the first auxiliary depth image and the second auxiliary depth image.

In some examples, at least one of the first and the second phase-depth mapping function may be based on a simulation.

Alternatively or additionally, at least one of the first and the second phase-depth mapping function may be based on a calibration of the ToF camera.

According to some examples, the ToF camera uses a modulated transmit signal for illuminating the scene and generates measurement signals based on reflected light from the scene. The individual phase images of the sequence of phase images are based on correlations of the transmit signal and the measurement signals according to a correlation function. A phase offset between the transmit signal and the measurement signals as used for the correlations is identical for the first phase image and the second phase image.

In some examples, determining the first auxiliary depth image may comprise for at least one pixel of the first auxiliary depth image: normalizing a phase value represented by a pixel of the first phase image for obtaining a normalized phase value, wherein the pixel of the first auxiliary depth image is located at the same pixel position in the first auxiliary depth image as the pixel in the first phase image; and determining a depth value represented by the pixel of the first auxiliary depth image based on the first phase-depth mapping function and the normalized phase value.

In other examples, the ToF camera uses a modulated transmit signal for illuminating the scene and generates measurement signals based on reflected light from the scene. The individual phase images of the sequence of phase images are based on correlations of the transmit signal and the measurement signals according to a correlation function. A phase offset between the transmit signal and the measurement signals as used for the correlations differs by 180° for the first phase image and the second phase image.

In some examples, determining the first auxiliary depth image may comprise for at least one pixel of the first auxiliary depth image: modifying a phase value represented by a pixel of the first phase image using the phase-value offset of the correlation function for obtaining a modified phase value, wherein the pixel of the first auxiliary depth image is located at the same pixel position in the first auxiliary depth image as the pixel in the first phase image; normalizing the modified phase value for obtaining a normalized phase value; and determining a depth value represented by the pixel of the first auxiliary depth image based on the first phase-depth mapping function and the normalized phase value.

Modifying the phase value represented by the pixel of the first phase image may in some examples be based on an expression which is mathematically correspondent to $L'=g-(L-g)$, with $L'$ denoting the modified phase value, $L$ denoting the phase value represented by the pixel of the first phase image and $g$ denoting the phase-value offset of the correlation function.

Determining the second auxiliary depth image may according to some examples comprise for at least one pixel of the second auxiliary depth image: normalizing a phase value represented by a pixel of the second phase image for obtaining another normalized phase value, wherein the pixel of the second auxiliary depth image is located at the same pixel position in the second auxiliary depth image as the pixel in the second phase image and the pixel in the first phase image; and determining a depth value represented by the pixel of the second auxiliary depth image based on the second phase-depth mapping function and the other normalized phase value.

The phase-value offset of the correlation function may in some examples be determined based on another phase image taken by the ToF camera without prior illumination of the scene.

Alternatively, the phase-value offset of the correlation function may be determined based on a combination of the first phase value, the second phase value and one or more further phase values. Each of the one or more further phase values is represented by a pixel of another phase image out of the sequence of phase images that is located at the same pixel position as the pixels in the first phase image and the second phase image.

The phase-value offset of the correlation function may in some examples be the mean value of the first phase value, the second phase value and the one or more further phase values.

According to some examples, the transmit signal exhibits a constant frequency during a transmit window for illuminating the scene.

In some examples, if the ToF depth measurement produces a two-dimensional depth image representing the scene, the information about depth motion relative to the ToF camera may be a two-dimensional image comprising a plurality of pixels each representing the depth motion for a corresponding pixel of the depth image.

If the ToF depth measurement produces a three-dimensional point cloud representing the scene, the information about depth motion relative to the ToF camera may according to some examples be a plurality of three-dimensional vectors each representing the depth motion for a corresponding point of the point cloud.

In some examples, the pixels in the first auxiliary depth image and the second auxiliary depth image being compared for determining the information about depth motion relative to the ToF camera may be located at identical pixel positions in the first auxiliary depth image and the second auxiliary depth image.

Alternatively, the pixels in the first auxiliary depth image and the second auxiliary depth image being compared for determining the information about depth motion relative to the ToF camera may be located at different pixel positions in the first auxiliary depth image and the second auxiliary depth image.

Still further examples relate to another apparatus for determining depth motion relative to a ToF camera in a scene sensed by the ToF camera. The apparatus comprises a processing circuit configured to determine a first auxiliary depth image based on a first phase-depth mapping function and a single first phase image out of a sequence of phase images of the scene taken by the ToF camera for one or more ToF depth measurements. Further, the processing circuit is configured to determine a second auxiliary depth image based on a second phase-depth mapping function and a single second phase image out of the sequence of phase images. The processing circuit is additionally configured to determine information about depth motion relative to the ToF camera for at least part of the scene based on a comparison of depth values represented by pixels in the first auxiliary depth image and the second auxiliary depth image.

Examples relate to a non-transitory machine readable medium having stored thereon a program having a program code for performing any of the methods for determining depth motion relative to a ToF camera as described herein, when the program is executed on a processor or a programmable hardware.

Other examples relate to a program having a program code for performing any of the methods for determining depth motion relative to a ToF camera as described herein, when the program is executed on a processor or a programmable hardware.

Further, examples relate to an apparatus for determining depth motion relative to a ToF camera in a scene sensed by the ToF camera. The apparatus comprises means for determining a first auxiliary depth image from a first set of phase images out of a sequence of phase images of the scene. The sequence of phase images is taken by the ToF camera for a single ToF depth measurement. In addition, the apparatus comprises means for determining a second auxiliary depth image from a second set of phase images out of the sequence of phase images. The phase images of the second set of phase images are different from the phase images of the first set of phase images. The apparatus further comprises means for determining information about depth motion relative to the ToF camera for at least part of the scene based on a comparison of depth values represented by pixels in the first auxiliary depth image and the second auxiliary depth image.

Still further, examples relate to another apparatus for determining depth motion relative to a ToF camera in a scene sensed by the ToF camera. The apparatus comprises means for determining a first auxiliary depth image based on a first phase-depth mapping function and a single first phase image out of a sequence of phase images of the scene taken by the ToF camera for one or more ToF depth measurements. The apparatus further comprises means for determining a second auxiliary depth image based on a second phase-depth mapping function and a single second phase image out of the sequence of phase images. Additionally, the apparatus comprises means for determining information about depth motion relative to the ToF camera for at least part of the scene based on a comparison of depth values represented by pixels in the first auxiliary depth image and the second auxiliary depth image.

Examples according to the proposed concept may allow to provide a motion estimate per pixel for each ToF depth measurement.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for determining depth motion relative to a time-of-flight camera in a scene sensed by the time-of-flight camera, the method comprising:
   determining a first auxiliary depth image from a first set of phase images out of a sequence of phase images of the scene, wherein the sequence of phase images is taken by the time-of-flight camera for a single time-of-flight depth measurement;
   determining a second auxiliary depth image from a second set of phase images out of the sequence of phase images, wherein the phase images of the second set of phase images are different from the phase images of the first set of phase images; and
   determining information about depth motion relative to the time-of-flight camera for at least part of the scene based on a comparison of depth values represented by pixels in the first auxiliary depth image and the second auxiliary depth image;
   wherein either (i) the time-of-flight depth measurement produces a two-dimensional depth image representing the scene and the information about depth motion relative to the time-of-flight camera is a two-dimensional image comprising a plurality of pixels each representing the depth motion for a corresponding pixel of the depth image or (ii) the time-of-flight depth measurement produces a three-dimensional point cloud representing the scene and the information about depth motion relative to the time-of-flight camera is a plurality of three-dimensional vectors each representing the depth motion for a corresponding point of the point cloud.

2. The method of claim 1, wherein the time-of-flight depth measurement produces a two-dimensional depth image representing the scene and the information about depth motion relative to the time-of-flight camera is a two-dimensional image comprising a plurality of pixels each representing the depth motion for a corresponding pixel of the depth image.

3. The method of claim 1, wherein the time-of-flight depth measurement produces a three-dimensional point cloud representing the scene and the information about depth motion relative to the time-of-flight camera is a plurality of three-dimensional vectors each representing the depth motion for a corresponding point of the point cloud.

4. The method of claim 1, wherein the first set of phase images is two consecutive phase images out of the sequence of phase images.

5. The method of claim 1, wherein the first set of phase images is the first two phase images out of the sequence of phase images, and wherein the second set of phase images is the last two phase images out of the sequence of phase images.

6. The method of claim 1, wherein the first set of phase images and the second set of phase images are separated by at least one intermediate phase image in the sequence of phase images.

7. The method of claim 1, wherein the time-of-flight camera uses a modulated transmit signal for illuminating the scene and generates measurement signals based on reflected light from the scene, wherein the individual phase images of the sequence of phase images are based on correlations of the transmit signal and the measurement signals according to a correlation function, wherein a phase offset between the transmit signal and the measurement signals as used for the correlations varies between the individual phase images of the sequence of phase images.

8. The method of claim 7, wherein the transmit signal exhibits a first frequency during a first part of a transmit window for illuminating the scene and a second frequency during a second part of the transmit window so that a first part of the sequence of phase images is associated to the first frequency and a second part of the sequence of phase images is associated to the second frequency.

9. The method of claim 8, wherein the first part of the sequence of phase images comprises the first set of phase images, and wherein the second part of the sequence of phase images comprises the second set of phase images.

10. An apparatus for determining depth motion relative to a time-of-flight camera in a scene sensed by the time-of-flight camera, the apparatus comprising a processing circuit configured to:
   determine a first auxiliary depth image from a first set of phase images out of a sequence of phase images of the scene, wherein the sequence of phase images is taken by the time-of-flight camera for a single time-of-flight depth measurement;
   determine a second auxiliary depth image from a second set of phase images out of the sequence of phase images, wherein the phase images of the second set of phase images are different from the phase images of the first set of phase images; and
   determine information about depth motion relative to the time-of-flight camera for at least part of the scene based on a comparison of depth values represented by pixels in the first auxiliary depth image and the second auxiliary depth image;
   wherein either (i) the time-of-flight depth measurement produces a two-dimensional depth image representing the scene and the information about depth motion relative to the time-of-flight camera is a two-dimensional image comprising a plurality of pixels each representing the depth motion for a corresponding pixel of the depth image or (ii) the time-of-flight depth measurement produces a three-dimensional point cloud representing the scene and the information about depth motion relative to the time-of-flight camera is a plurality of three-dimensional vectors each representing the depth motion for a corresponding point of the point cloud.

11. The method of claim 1, wherein said comparison of depth values represented by pixels in the first auxiliary depth image and the second auxiliary depth image comprises a comparison of pixels at different pixel positions in the first and second auxiliary depth images, to determine information about motion transverse to the time-of-flight camera.

12. The apparatus of claim 10, wherein said comparison of depth values represented by pixels in the first auxiliary depth image and the second auxiliary depth image comprises a comparison of pixels at different pixel positions in the first and second auxiliary depth images, to determine information about motion transverse to the time-of-flight camera.

* * * * *